Nov. 13, 1923.

G. D. ROSE 1,474,167

STEERING WHEEL AND PROCESS OF FORMING THE SAME

Filed March 3, 1921

INVENTOR:
George Daubney Rose
By Wm Wallace White
ATTY.

Patented Nov. 13, 1923.

1,474,167

UNITED STATES PATENT OFFICE.

GEORGE DAUBNEY ROSE, OF MANCHESTER, ENGLAND.

STEERING WHEEL AND PROCESS OF FORMING THE SAME.

Application filed March 3, 1921. Serial No. 449,456.

*To all whom it may concern:*

Be it known that I, GEORGE DAUBNEY ROSE, a subject of the King of Great Britain, residing at 56ª Mosley Street, Manchester, in the county of Lancaster, England, have invented new and useful Improvements in or Relating to Steering Wheels and Processes of Forming the Same, of which the following is a specification.

The invention relates to steering wheels for motor cars, motor boats, air craft or the like and has for its object the provision of a wheel of this character of improved, less expensive, and more durable construction than heretofore.

For this purpose it is proposed to form the rim of the wheel, or in some cases the whole wheel, of coir fibre either alone or combined with other fibre and impregnated or combined with rubber or other adhesive material submitted to pressure, and covered or not as desired with vulcanite and finally vulcanized the boss and spokes being in most cases formed of metal as heretofore.

In the accompanying drawings:—

Figure 1:
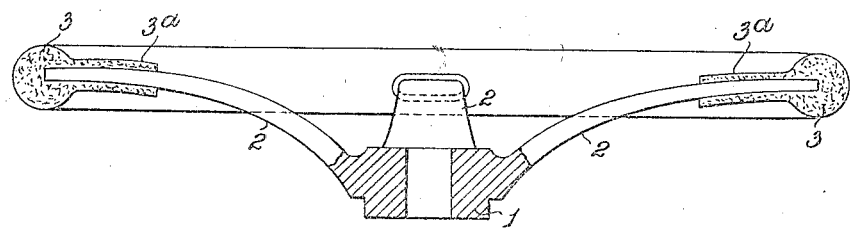
Figure 2:
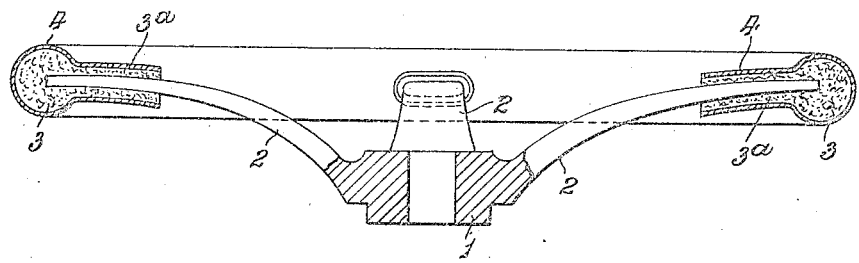

Figure 1 represents a section of a steering wheel constructed according to the present invention as it would appear before it is submitted to the finishing process, and Figure 2 is a similar view illustrating the finished wheel.

Referring to the drawings, 1 represents the boss of the wheel which, together with the spokes 2 radiating therefrom, is formed of metal in the usual way and 3 represents the rim which is formed of coir fibre either alone or intermixed with other fibres and impregnated or combined with rubber or other suitable adhesive material submitted to a suitable pressure and finally vulcanized.

The spokes 2 are so arranged that they penetrate the rim 3 to a considerable extent and the coir fibre material is extended along each of said spokes, as shown, thus forming sockets 3ª in order to strengthen the structure.

Any suitable mould may be employed for constructing a steering wheel according to the present invention, for example, such as that which is employed for pressing steering wheels in steel.

The spokes 2 are arranged in a suitable position in the die box and the coir fibre, which may if desired, be woven or plaited, is, either alone or combined with other fibre, laid in the mould in layers until it reaches a certain height and so that it embraces or covers the ends of the spokes 2.

Between the layers of material hereinbefore described are laid layers of rubber for which purpose any kind of waste rubber such as old tires may be employed if desired, or any other suitable adhesive material may be employed for this purpose, or the fibres may be impregnated with or steeped in any suitable solution before they are laid in the mould.

While in the mould, which is of a size somewhat smaller than the finished rim, the rim built up in the manner above described is submitted to a suitable pressure and then semi-vulcanized.

The wheel is then removed from the mould and the rim 3 and sockets 3ª and covered with a thin covering of vulcanite 4 as shown in Figure 2 after which the wheel is placed in a mould of the dimensions necessary to impart to the device the size desired for the finished rim and again submitted to a suitable pressure and finally vulcanized.

If desired the whole wheel may be formed of coir fibre in the manner hereinbefore described but in that case it would be desirable to form the boss 1 of metal although said boss might be formed of coir fibre combined or not with other fibre if desired and it will be obvious that the details of construction of the wheel might be otherwise modified without departing from the principle of the invention.

What I claim as my invention and desire to secure by Letters Patent is:—

1. A steering wheel, comprising a metallic spider having radially extending spokes, a molded rim formed of a mixture of coir fibre and an adhesive material secured to said spokes under pressure and semi-vulcanized, the fibre being so disposed along each of said spokes as to form sockets for the ends of the spokes, and a covering of vulcanite vulcanized on said rim.

2. The process of forming a steering wheel, which consists in supporting a spider having spokes in a mould, laying layers of coir fibre impregnated with an adhesive material in said mould until said layers embrace and cover the ends of the spokes, thereby to form a rim, subjecting said rim to pressure, and applying a covering of vulcanite to the rim and vulcanizing the same.

3. The process of forming a steering wheel, which consists in supporting a spider having spokes in a mould, laying alternate layers of coir fibre and rubber in said mould until said layers embrace and cover the ends of the spokes, the fibre being extended along each of said spokes to form sockets, said fibre and rubber forming a rim, subjecting said rim to pressure and semi-vulcanizing the same, applying a covering of vulcanite to the rim, and again subjecting said rim to pressure in a suitable mould and vulcanizing the same.

In testimony whereof I have signed my name to this specification.

GEORGE DAUBNEY ROSE.

Witnesses:
C. H. WHITE,
HERBERT ROWLAND ABBEY.